S. P. Smith.
Horse Rake.
No. 89697. Patented May 4, 1869.
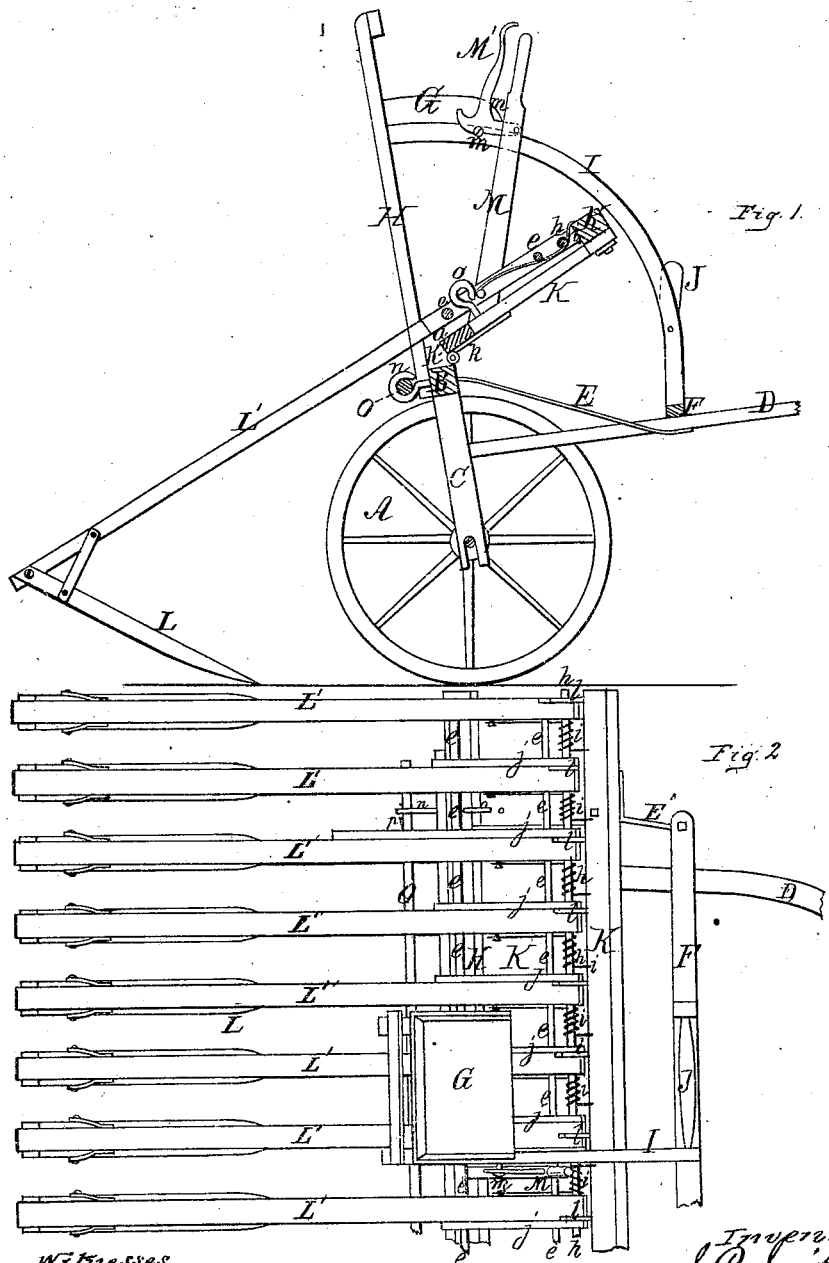

UNITED STATES PATENT OFFICE.

SOLOMON P. SMITH, OF WATERFORD, NEW YORK.

IMPROVEMENT IN HORSE-RAKES.

Specification forming part of Letters Patent No. 89,697, dated May 4, 1869.

*To all whom it may concern:*

Be it known that I, SOLOMON P. SMITH, of Waterford, in the county of Saratoga and State of New York, have invented a new and Improved Horse Hay-Rake; and I do hereby declare that the following is a full, clear, and exact description of the construction and operation of the same, reference being had to the accompanying drawings, making a part of this specification, in which—

Figure 1 is a longitudinal vertical section. Fig. 2 is a plan.

This invention relates to that class of horse hay-rakes in which wooden teeth are employed; and the object is to construct the rake in such a manner as to render it more perfectly adjustable to the inequalities of the ground and the character of the work than heretofore.

In the drawings, A A are the draft-wheels. B is a cross-bar above them, supported by four standards, C C, two of which rest vertically on the end of each axle. D D are the thills, framed into the two inner standards, and provided with braces E E' and the usual cross-bar F. G is the driver's seat, connected to the part B by two standards, H H, and to the cross-bar F by a curved bar, I. J is a foot-rest for the driver, and K is a frame, connected to the bar B by means of hinges $k\,k$, upon which it rocks, and supporting the teeth L L, the drag-bars of which are hinged to its upper cross-beam by means of the lugs $l\,l$ and the rod $h$, so that they lie across the lower cross-beam of the frame, in the manner clearly shown by Fig. 1. Each drag-bar is independent of all the rest. Each is provided with a spring, $i$, of its own, which tends to hold the teeth down to the ground. Each drag-bar is provided with a side piece, $j$, connected to it by two rods, $e\,e$, and hinged to the rod $h$, as shown in Fig. 2, the object of the parts $j\,e\,e$ being to brace the drag-bars and to keep them in place.

The whole frame K, with the teeth and drag-bars, is so constructed as to be nearly balanced on the pivots $k\,k$, the weight of the parts behind the pivots slightly overbalancing that of the parts before them, so that the teeth as a whole bear on the ground with a slight force, and can be easily raised by a gentle pressure on the upper cross-bar of frame K.

It will be observed that the height of the cross-beam B and the frame K above the ground is such as to bring the drag-bars L' L' at a steep incline, and thereby to bring the teeth L L nearly horizontal.

The intended effect of this peculiar arrangement will be hereinafter explained.

M is a handle, rigidly fixed to the frame K, and extending up alongside of the curved bar I. $m$ is a pin, projecting from the side of the curved bar, to which the handle can be fastened by means of a spring-catch, M'.

The position of the pin $m$ is such with relation to the thills, drag-bars, and frame K that when the thills are attached to the horse's harness and the catch connected with the pin, as seen in Fig. 1, the teeth L L will press with considerable force upon the ground and the drag-bars L' L' will be raised above the lower cross-beam of frame K, so as to leave a space, $a$, between them and the cross-beam. The drag-bars being thus raised from the frame, the force of the springs $i\,i$ is increased and brought to bear with all its increased power upon the drag-bars and teeth, thus pressing the latter against the ground, as above alluded to.

It is evident that, if the catch M' be suddenly liberated when the parts are in this position, the action of the springs $i\,i$ will close the drag-bars and frame K together with such violence as to throw the teeth up from the ground for an instant, when they will fall again by their own weight, and that to produce this effect properly it is necessary that the parts K L' L should be nearly balanced on the fulcrum $k\,k$, as above described.

It is also evident that if, when the catch is thus suddenly liberated, a large quantity of hay be compressed between the drag-bars and the ground, the elasticity of such hay will assist the springs $i\,i$ to suddenly lift the drag-bars and teeth.

In the working-machine as constructed and employed in the field by the inventor and others it has been demonstrated that these two forces—that of the springs and that of the compressed hay—will be sufficient to throw the teeth up out of the hay and leave the latter in a windrow, while the rake passes on and the teeth drop to the ground on the other side of the windrow thus formed with such force as to throw the handle M up and automatically lock the catch over the pin again.

One advantage of the rake thus constructed and operating is, that while the pin and catch m M thus bend the spring of every drag-bar and cause all the teeth to be held in contact with the ground, so as to rake cleanly, yet, upon coming to an obstacle, each drag-bar is free to rise over it independently of all the others, and upon coming to a depression in the ground each drag-bar is free to drop into it independently of the others.

When raking up windrows into bunches for the purpose of loading, cocking up the hay, or otherwise, a bar, O, may be inserted into the eyebolts $o\ o\ o$, so as to extend across above the drag-bars, confine them to the frame K, and prevent their springing up or rising independently of each other. When not thus in use, the bar O may be inserted into the eyebolts $n\ n$ on the rear side of the cross-beam B under the drag-bars, where it will be out of the way.

To prevent the bar O from working out of place it may be provided with a pin and a spring-stop, $r$, similar to those commonly employed on umbrella-handles, which will, in connection with some one of the eyebolts, lock it securely in place.

The pin $m$ may be placed at any suitable point on the curved bar I, and a series of holes may be made in the bar to render the device adjustable at pleasure.

Having thus described my invention, what I claim as new, and desire to secure by Letters Patent, is—

1. The detachable and removable bar O, in combination with the drag-bars L' L' and eyebolts $o\ o$, attached to the tilting frame K, substantially as and for the purpose described.

2. The tilting frame K, in combination with the catch M' $m$, handle M, drag-bars L' L', and teeth L L, when the frame, drag-bars, and teeth are so constructed as to be nearly balanced on the hinges $k\ k$, substantially as and for the purposes specified.

3. The tilting frame K, springs $i\ i$, drag-bars L' L', and teeth L L, in combination with a catch, M' $m$, when the parts are constructed to operate together, substantially as and for the purposes set forth.

To the above specification of my improvement I have set my hand this 8th day of February, 1869.

SOLOMON P. SMITH.

Witnesses:
CHAS. A. PETTIT,
SOLON C. KEMON.